Nov. 24, 1959   C. WAGNER   2,914,063
PRESSURE COOKING APPARATUS
Filed April 26, 1956   2 Sheets-Sheet 1
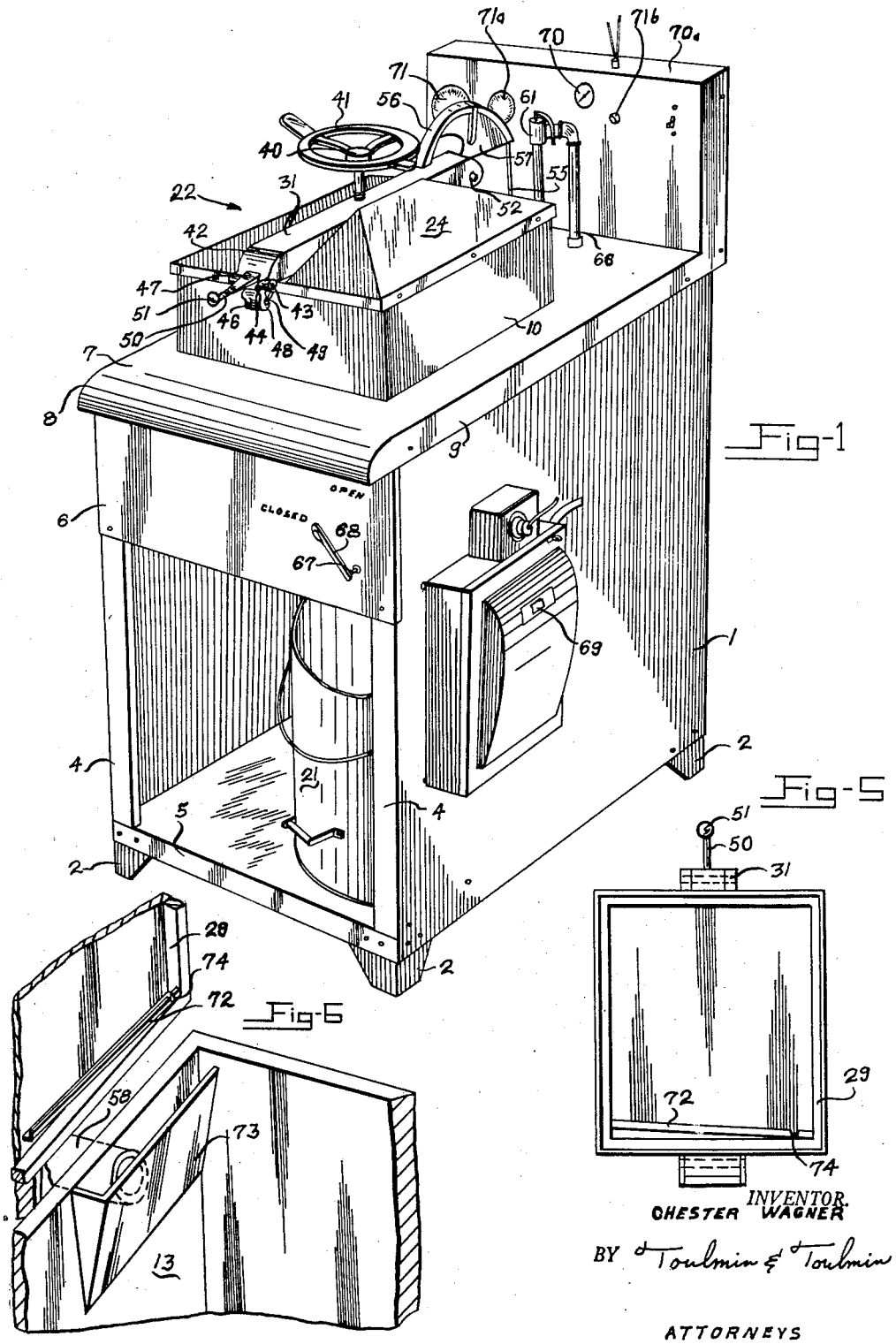
INVENTOR.
CHESTER WAGNER
BY Toulmin & Toulmin
ATTORNEYS

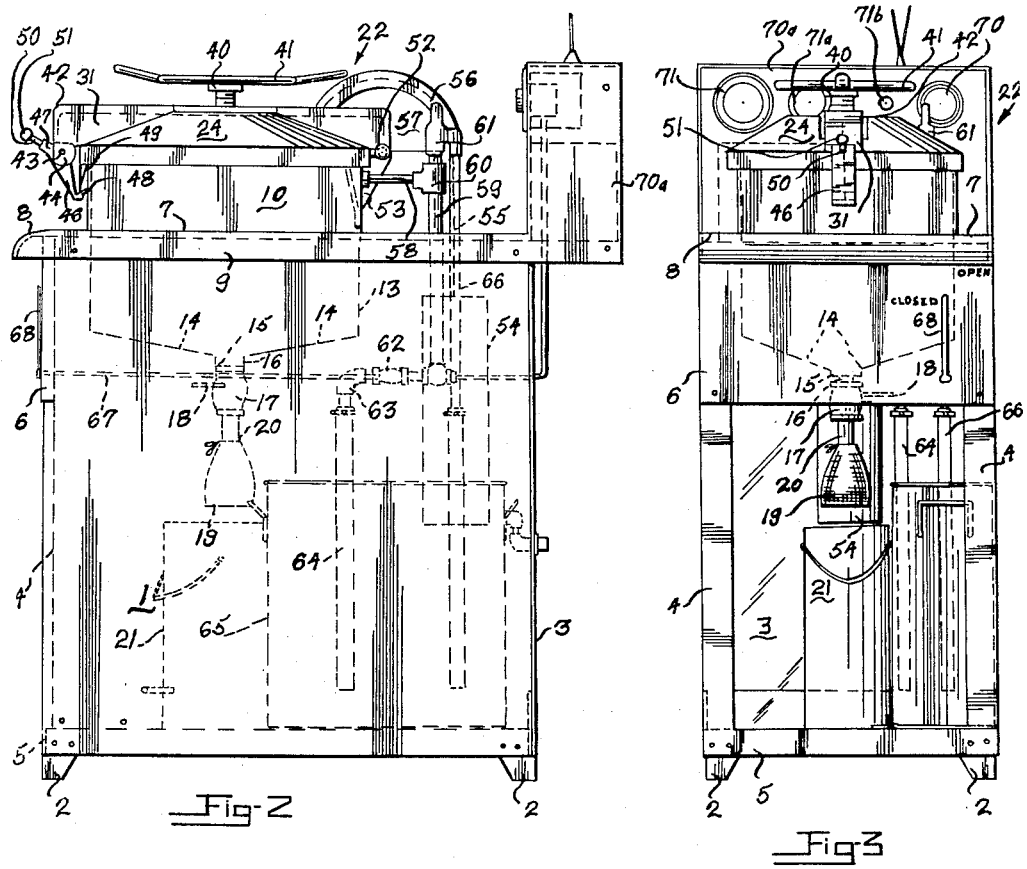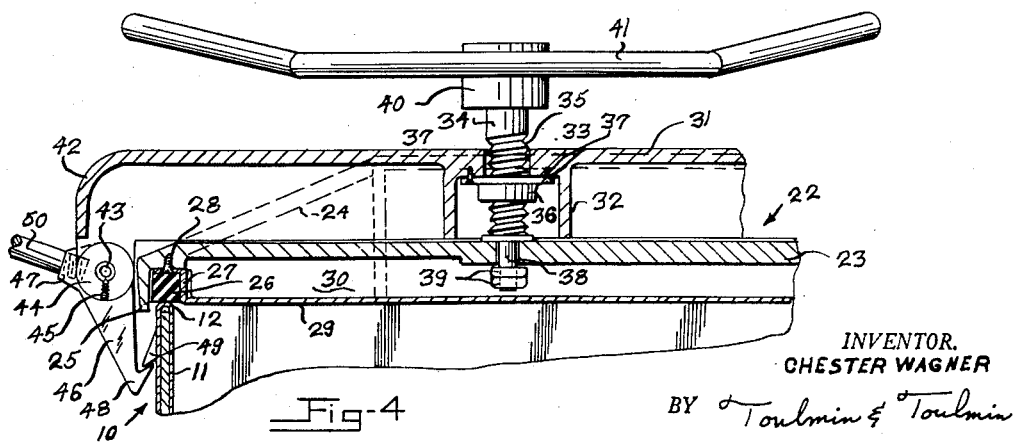

United States Patent Office 2,914,063
Patented Nov. 24, 1959

2,914,063

PRESSURE COOKING APPARATUS

Chester Wagner, Eaton, Ohio

Application April 26, 1956, Serial No. 580,758

1 Claim. (Cl. 126—381)

The present invention relates to apparatus for combining the advantages of deep fat frying with the advantages of a pressure cooker and is of the general character shown and described in my Patent No. 2,778,736, granted January 22, 1957.

In the application referred to, there is disclosed cooking apparatus in which the cooking is performed by the use of fat or grease in combination with the use of steam under pressure, but preferably without introducing water into the vessel. In this case, the steam is supplied solely from the moisture in the food which may, for example, be constituted of chicken, French fried potatoes or other food that is susceptible to being cooked in deep fat.

I have found, as a result of considerable development work, that not only is it desirable to obtain the moisture from which the steam pressure is developed from the contained food, but it is even more essential that no more moisture be permitted to reach the cooking space than is contained in the food.

In line with this discovery, I have found that after the cooking step, and upon raising the lid of the pressure chamber, the moisture that has been converted into steam during the cooking operation will condense on the interior surface of the lid, due to the cooling effect of the atmosphere, and unless removed before the next charge of food enters the cooking compartment, will cause an excess of water in the vessel, tending to raise the pressure beyond the optimum limit and, in general, causing a parboiling of the food during the cooking operation.

Thus, the results of my discovery have shown that the moisture contained, for example, in a freshly killed chicken, is just adequate, no more and no less, to supply the steam pressure necessary to place the boiling fat under pressure and thus quickly cook and tenderize the meat. Any excess of moisture, as when more water is added or left over from a previous cooking, has the effect of over-cooking the meat or other food, causing it to lose its flavor and drop from the bones or to render the food unpalatable.

The primary object of the invention is to provide a method and apparatus for deep fat cooking of foods in which the variable factors, such as time of cooking, the pressure to which the fat is subjected, the level of the fat in the cooking receptacle, and the quantity of moisture, and therefore the steam contained within the receptacle, are controlled. These factors contribute to the quality of the product which is controlled within close limits, thereby adding to the tenderness, flavor and appearance of the cooked product.

Another object of the invention is to provide a combined moisture-pressure, deep-fat cooker, especially suited for cooking meats such as chicken, and in which the moisture content of the cooker is at all times limited to not more than that contained in the particular charge of food that is being momentarily cooked.

A further object is to provide cooking apparatus having a pressure lid and which requires cooking fat and steam under pressure, derived solely from the moisture contained in the meat or other food.

Still another object is to provide a cooker with provision for a fat content under pressure and in which the amount of moisture converted into steam for applying the pressure to the fat is strictly controlled by the amount and character of the food contained in the cooker.

A further object is to provide cooking apparatus for receiving meats and vegetables which are cooked by the combined effects of boiling fat and dry steam derived from the residual moisture of the meats and the vegetables, without added water.

A still further object is to provide a cooker employing deep fat under pressure and in which the pressure medium is obtained solely from the moisture contained in the food being cooked.

The above objects are attained, in brief, by eliminating the excess moisture remaining after each cooking. The excess moisture in the form of steam is caused to condense on any suitable surface which forms part of the cooking space and can be quickly cooled by atmospheric air, and then permitted to drain from this surface to a position exterior of the cooker as a thin stream of water. Thus, each cooking employs not only the deep fat but also steam for placing the fat under pressure and for adding its cooking effects to those of the fat, and such steam is derived solely from the moisture contained in the food articles that are being momentarily cooked.

Other objects and features will be apparent as the specification is perused in connection with the accompanying drawings, in which:

Figure 1 is a view, in perspective, of a cooker improved in accordance with the principles of my invention;

Figure 2 represents an elevational side view of the cooking apparatus;

Figure 3 is a front view, also in elevation, of the improved cooking device;

Figure 4 is a sectional view, but with the clamping wheel in elevation, of the upper portion of the cooker, to illustrate the manner in which the lid is pressed against the body of the cooker in order to retain the requisite pressure within;

Figure 5 depicts an elevational view of the lid of the cooker to show the position of the condensed moisture-collecting element, represented by a gutter; while Figure 6 illustrates a corner detail, in perspective, of the upper portion of the cooker showing the drain structure into which the gutter shown in Figure 5 empties for removing the excess moisture.

Referring more particularly to Figures 1, 2 and 3, reference character 1 designates the two opposite sides of the cooker. These sides may be conveniently made of sheet steel or any other suitable metal. The cooker is supported on legs 2 and the rear walls 3 of the device (Figure 2) may be also constituted of sheet steel, perhaps in all cases stainless steel.

The front of the cooker is provided with hollow bars 4 which may be porcelain treated, connected by a horizontal bar 5, also porcelain coated. There is a transverse plate member 6 extending across the width of the cooker, coated with porcelain or simulated porcelain material for ornamental and cleaning purposes. The top of the cooker may comprise a plate 7 having a rolled front edge 8 and narrow plate 9 are attached to the main plate 7. There is a large rectangular opening in the plate 7, snugly but slidably to receive a rectangular receptacle 10 made of rather heavy stainless steel and extending perhaps 3" or 4" above the plate 7.

As shown in Figure 4, the walls, both front and back of the receptacle 10, may be constituted of thin stainless sheet metal 11, bent over at the top as indicated at 12, in order to eliminate sharp edges. The walls 10 are suitably supported on the plate 7 and extend below the opening in the plate for a considerable distance as indicated at 13. The bottom of the rectangular extension 13 is closed by four inclined plate portions 14 through which an opening 15 extends at the center (Figure 2).

A pipe 16 is taken from this opening to a dump valve 17 (operated manually) as indicated at 18, this valve communicating with a bag 19 through a pipe 20. The bag contains a disposable filter paper. A bucket 21 (Figure 1) is normally placed under the filter bag, the reason being that when the fat or grease that is contained within the receptacle 13 becomes charged with solid matter, perhaps pieces of potato or pieces of chicken, it may be nceessary to dump all of the fat through the filter 19 into the bucket 21, leaving the screened solid particles within the bag. The filter can then be either cleaned or removed. The screened fat will be returned to the container 13, free from solid matter. If desired, the bottom of the cooking pot can be covered with heavy filter paper to act as a drop cloth for breading crumbs, so that in cleaning the pot, most of the excess breading which falls to the bottom of the pot can be removed in one operation.

The top of the pot or receptacle is provided with a hinged cover, shown generally at 22, and formed by a fairly heavy plate 23 (Figure 4) extending over the entire width and length of the cover, with a simulated "hip" roof structure 24 extending upwardly from the plate 23, and all made of stainless steel. The plate 23 is provided about its perimetrical edge with a recess 25 for receiving a strip of rubber 26. This strip rests snugly at the rolled edge 12 of the walls 10 in order to provide a hermetic seal when the lid is closed and pressure is applied thereto. Between the rubber strip and the horizontal surface of the recess 25 there is a flanged extension 27 screwed to the plate 23, as indicated at 28, and forming a lining 29 which extends across the length and width of the plate 23 to close off the space 30 within the plate.

In order to apply pressure to the heavy plate 23 and thereby cause the rubber strip 26 to bear tightly against the rolled-over edge 12 to effect a hermetic seal, a rigid bar 31 is provided which extends lengthwise of the cover. There is a wide gap provided in the hip roof 24 of the cover in order snugly to receive the bar, and flanges 32 extend from the bar through this gap to rest upon the plate 23 as shown in Figure 4.

There is an opening 33 in the bar 31 in order loosely to receive a rod or shaft 34 with fairly coarse threads 35. These threads engage a threaded opening in a follower 36 which is screwed as indicated at 37 to the under surface of the bar 31. The lower end of the rod 34 terminates in a turned down shaft 38, threaded at the end and loosely extending through the plate 23. Nuts 39 are applied to the threaded end of the rod.

There is provided a hub 40 at the upper end of the rod 34 and this hub forms part of a wheel 41. Thus, by turning the wheel, the threads 35 will cause the follower 36 to move either upwardly or downwardly, depending upon the direction of turning the wheel so that a pulling pressure can be exercised at the nuts 39 to cause the bar 31 to be tightly clamped against the plate 23. The purpose of the wheel during operation of the cooker will be described presently.

The bar 31 may be made hollow, suitably flanged at the sides, and at the front end of the cooker the bar is rounded, as indicated at 42, to support a hub member (not shown) for rotatably carrying a shaft 43. This shaft serves as a bearing for a collar 44 to which it is secured by a set screw 45. This collar forms part of a lever 46 having a diagonal extension 47 at one end and a hook extension 48 at the other or lower end. This hook member fits under and catches with a latch 49 secured to the wall 10.

A rod 50 is screwed into the extension 47, this rod terminating in a hand-operated knob 51. Thus, by swinging the knob 51 in the vertical plane, and assuming that the lid 21 is in the down or closed position, the catch 48 will tightly engage the latch 49 and will hold the lid or cover securely in place. The other end of the bar 31 is hinged, as indicated at 52, to the rear end walls 10 from which a suitable reinforcing lug 53 may extend. Consequently, after the catch 48 has engaged the latch 49 by moving the knob 51, and in order to secure a hermetic joint at the rubber strip 26, the wheel 41 is rotated in such a direction that the bar 31 is pulled away from the plate 23 and the effect is to exert an upward pull on the lever 46 which, in turn, causes a strong downward pressure to be exerted between the rubber strip 26 and the upper edge of the wall 10.

Thus, the hook 48 must make contact with the member 49 by moving the rod 50 before the wheel 41 can exert an upward pull on the bar 31 and therefore, in effect, a downward push on the plate 23 against the walls 10. By the same token, in order to relieve the hermetic seal at the strip 26, it is first necessary to rotate the wheel 41 in such a direction that the bar 31 and the plate 23 are caused to move slightly together to relieve the pressure at the hook 48, at which time the latter can be unfastened by swinging the rod 50 upwardly.

When the lid 22 including the bar 31 is moved upwardly by swinging still farther the rod 50, the weight of the cover as a whole is counterbalanced by means of a counterweight 54 (Fig. 2) to which a cable 55 is secured. This cable is guided through a grooved arcuate member 56 which is secured by a web 57 to the bar 31.

From the upper edge of the receptacle there is taken a pipe 58 which communicates with a vertical pipe 59 through a T-coupling 60 (Fig. 2). An adjustable relief valve 61 is carried on the end of this T-connection. The pipe 59 extends downwardly into the interior of the cooker base and then passes through an adjustable valve 62, through an elbow 63 to an exhaust pipe 64. This exhaust pipe terminates in a metal tank 65. From the relief valve 61 there is also taken a pipe 66 which additionally terminates in the tank 65.

There is a rod 67 extending through the base from the adjustable valve 62 to a hand-operated lever 68 in the front wall of the base. This handle, as shown in Fig. 1, has closed and open positions and when manually moved to the closed position, the valve 62 is closed, and when moved to the open or vertical position, the valve 62 is open to allow direct communication from the interior of the receptacle 10 to the interior of the tank 65 for exhaust of the pressure built up within the receptacle at the termination of the cooking period.

The relief valve 61 can be set at any desired excess pressure reading so that in case the pressure within the receptacle 10 goes higher than a predetermined pressure, this relief valve will automatically open and will also put the interior of the receptacle 10 in communication with the tank 65 for a rapid relief of the excess pressure. Thus, the handle 68 serves to relieve the entire pressure (i.e. greater than atmosphere) within the receptacle 10 and the valve 61 serves merely to relieve only the excessive pressure but to leave the normal pressure within the receptacle 10 until the latter is fully relieved by the hand-operated lever 68.

In operation, when it is desired to cook meat, such as chicken or other food, such as potatoes, fat or oil is poured into the receptacle by opening the lid structure 24 on its hinges 52. The height to which the fat is supplied will depend on the amount of food that is placed in the receptacle, as the level of fat is fairly critical for the purpose of my invention, and is determined generally by experiment. In general, the greater the amount of food placed in the receptacle, the less will be the quantity of fat necessary, and of course the more economical will the cooker operate on account of the less fat that need be supplied, because, as stated, the level of the fat should remain at substantially the same height regardless of the amount of food contained in the receptacle.

The contents of the receptacle, including the food and the fat, can be heater by gas, but preferably by electricity, using resistance coils or rods and controlled by a switch 69 (Fig. 1). I have found, due to considerable development work, that as the fat starts to boil, moisture comes out of the meat and this moisture does two things, (1) it allows the heated fat to enter deeply into the meat and (2) it supplies the steam by which to place the fat under pressure, thereby insuring a deep cooking effect, and at the same time, provides a modified steaming action which, together with the deep frying effect, serves quickly to thoroughly cook the meat and to tenderize the same.

I have found, in general, that by the use of the steam pressure which provides a pressurized action within the receptacle, and combining this operation with the deep fat frying function, chicken, regardless of the amount of load within the receptacle, and using a reasonable amount of fat, can be cooked within seven minutes, using nine pounds pressure as indicated on a gauge 70. This gauge may be mounted on a rear panel 70a. The optimum cooking temperature is approximately 325° F. which may also be shown on a gauge 71. These gauges may be coupled to the interior space of the receptacle 10 in any suitable and well known manner.

Under these circumstances and using ordinary cookers, i.e. unimproved devices, the time taken to cook chicken in the same amount would be from 20 minutes to a half-hour so that my improved cooker reduces the cooking time to at least one-third and possibly one-fourth of the normal cooking time taken by ordinary pressure cookers which utilize only steam, and ordinary deep-fat fryers which use no steam under pressure.

I have found that frying under pressure changes the ratio of food from one pound of raw food to six pounds of fat as in the case of ordinary deep-fat frying, to one pound of raw food to three pounds of hot fat. In other words, twice as much food can be prepared at one time as can be done with the same amount of fat in regular deep-fat frying. It will therefore be understood why more fat is added to prepare one order than is used to fry twenty orders. It is a simple matter of lowering or increasing the height of the grease line. When one order is needed, more fat is needed and when twenty are needed, the grease line is lowered to provide for food displacement.

The next two factors that had to be determined was the proper pressure and the time needed to fry the food under steam pressure and hot fat conditions. Using chicken as a yardstick, it was found that any desired pressure could be obtained by relating the grease line to the amount of food. With this fact determined by the use of the pressure gauge 70 and the adjustable safety valve 61, it was found that nine pounds pressure produced a more desirable product than higher pressures and the time needed to fry the food was not greatly affected.

It was further learned that the temperature variation was less in my improved method than in the sole deep-fat frying method and in the sole steam cooking method. From this study it was established that nine pounds pressure and 325° F. were desirable. With these facts known, a time schedule was worked out on various food loads and found to be the same, no matter if one or twenty orders were processed. The only change needed was the addition of more fat when one order was processed. The finished food products are improved because the time, temperature and pressure are balanced and controlled. Many food variations, such as puffed potatoes, can be produced that are impossible with ordinary deep-fat frying.

It will be understood that the time element can be readily effected by means of any suitable and well known timing device, indicated on the drawing at 71a, which may be set by the operator and would automatically serve, at the end of a predetermined time period, to cut off the electrical energy or the gas which may be supplying the heat to the cooker. A red light 71b may also be installed on the rear panel of the cooker to indicate when the electrical circuit is closed or when the gas is turned on and the heaters are operating.

In my prior application referred to hereinbefore, it was pointed out that it was highly desirable that the pressure being developed within the cooker should be obtained from the moisture that is naturally given off by the food being cooked. While satisfactory food products can be obtained by adding water to the cooker before the lid is hermetically sealed, the best results by far are obtained by employing only the water that is exuded by the food products. Each batch of food, whether one chicken, less than a whole chicken, or even a number of chickens, gives off sufficient moisture upon cooking to supply adequate steam. In case more than the necessary moisture is provided in this manner, the excess above a predetermined amount, as shown by an excess of pressure, is automatically siphoned off in the form of steam through the exhaust valve 61. The latter is normally set at nine pounds pressure and pops open when the steam pressure caused by excess moisture becomes too high.

In accordance with an object of this invention, means are provided by which the excess moisture left over from a previous cooking is entirely removed from the cooking receptacle so as to be assured that only the moisture contained within the food that is momentarily being cooked is used to provide the necessary steam pressure. As shown in Figs. 5 and 6, there is provided a gutter 72 running along and secured to the lower edge of the lid lining 29, this gutter having a slight vertical slant in order to cause any moisture droppings to run from one end to the other.

Directly below the lid when the latter is in its open condition, a trough 73 is provided, this trough constituting a V-shaped pocket and is secured to the rear wall 13 of the cooking apparatus. The top portion of the pocket is open, as shown more clearly in Fig. 6. A notch or drain slot 74 is provided at the lower end of the gutter 72 so that the water collecting in the gutter, when the lid is open, will flow through the notch 74 into the drain trough 73. The pipe 58 which communicates with the interior of the cooking receptacle may have its entrance within the trough 73 so that any water contained within the trough (beyond a certain level) will run off through the pipe 59 and the valve 62 (when open) to the tank 65.

The purpose of the gutter will be readily understood. Assuming that a chicken load has been cooked according to the pressure, the temperature and timing conditions mentioned above, the first step is to move the lever 68 to the vertical or exhaust position. Then the wheel 41 is rotated to reduce the mechanical pressure at the hook 48 on the projection 49. The latch can then be completely disengaged by lifting up at the knob 51, thus breaking the seal at 26. The moment that the seal is broken, the atmosphere is admitted into the receptacle and as the lid is continued to be raised, more and more air is admitted. The coolness of this air striking the steam within the receptacle immediately causes the steam to condense on the lining member 29.

Consequently, as the lid is swung on its hinges farther upwardly, the condensed moisture collects in beads of considerable size which run together by the time that the lid approaches the vertical position and the water then flows downwardly over the entire lining to be collected by the gutter 72. It should be pointed out that at the conclusion of the cooking period, the lever 68 is moved quickly to the open position (i.e. vertical as shown in Fig. 1) and this serves to open the valve 62 through the rod 67 which additionally allows air to reach the interior of the receptacle, assuming that the bottom of the pipe 64 is open to the atmosphere.

Thus, the water that flows from the surface of the lining 29 through the gutter 72, through the notch 74, into the trough 73 and through the pipe 58, finds its way into the tank 65. By the time that the next batch of food is placed in the fat contained in the receptacle and the level of the fat brought up or lowered to the proper grease line, according to the size of the food load, the lining 29 is completely rid of any moisture and only such residual moisture is contained within the receptacle as is normally present in the atmosphere. The lid is then lowered by pulling down on the knob 51 until the latch 48 is fastened, after which the wheel 41 is turned to provide the necessary hermetic seal at the rubber strip 26.

From the foregoing, it is evident that I have disclosed not only an improved method for cooking food products, particularly chicken and other meats and vegetables, also suitable apparatus for the cooking process, but in addition, have assured that each article of food, regardless of the food load, will supply its own moisture to produce the necessary steam by which the oil is placed under pressure and there is no carrying over of moisture from the preceding cooking operation.

While I have illustrated for the purpose of my invention a gutter applied solely to the lid, which is normally most susceptible to condensed moisture, it will be understood that a gutter may be provided on any and all parts of the receptacle where moisture does condense after the cooking operation has ended and cool air is admitted to the receptacle, these additional gutters being arranged to empty into a common trough from which it is piped to a tank through a valve which is normally closed during the cooking operation but can be opened when the operation has been completed.

It will be understood that various modifications and arrangements in structure could be made without departing from the spirit of my invention and, accordingly, I desire to comprehend such modifications and substitutions of equivalents as may be considered to come within the scope of the appended claim.

Having thus fully described my invention, what I claim as new and desire to secure by Letters Patent, is:

Apparatus for deep fat frying comprising a container having a hinged lid, said container being adapted to receive fat for cooking food, means for applying heat to the container and the fat, means for placing the fat under pressure, and a gutter secured to the lower edge of said lid for collecting the condensed moisture when the lid is opened, and means for conducting the moisture from the gutter to a position external of the container, said last mentioned means comprising an opening at the end of the gutter, and a trough secured to the cooking apparatus at a position directly below said opening and remaining in a position as to receive all of the water from the gutter as the lid is continued to move to its open position.

References Cited in the file of this patent

UNITED STATES PATENTS

| | | |
|---|---|---|
| 1,393,762 | Demuth | Oct. 18, 1921 |
| 2,060,434 | Vincent | Nov. 10, 1936 |
| 2,175,332 | Wertheimer | Oct. 10, 1939 |
| 2,186,845 | Stiles | Jan. 9, 1940 |
| 2,452,472 | Keating | Oct. 26, 1948 |
| 2,532,639 | Payne | Dec. 5, 1950 |
| 2,540,924 | Young et al. | Feb. 6, 1951 |
| 2,649,853 | Larkin | Aug. 25, 1953 |
| 2,755,795 | Webber | July 24, 1956 |
| 2,778,736 | Wagner | Jan. 22, 1957 |